United States Patent
Liu et al.

(10) Patent No.: US 10,827,522 B2
(45) Date of Patent: Nov. 3, 2020

(54) METHOD AND APPARATUS FOR DETERMINING CHANNEL OCCUPANCY

(71) Applicant: Beijing Zhigu Tech Co., Ltd., Beijing (CN)

(72) Inventors: Wentao Liu, Beijing (CN); Yong Li, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 89 days.

(21) Appl. No.: 15/234,026

(22) Filed: Aug. 11, 2016

(65) Prior Publication Data
US 2017/0055286 A1    Feb. 23, 2017

(30) Foreign Application Priority Data
Aug. 19, 2015 (CN) .......................... 2015 1 0512659

(51) Int. Cl.
*H04W 4/00* (2018.01)
*H04W 74/08* (2009.01)

(52) U.S. Cl.
CPC .............................. *H04W 74/0808* (2013.01)

(58) Field of Classification Search
None
See application file for complete search history.

(56) References Cited

U.S. PATENT DOCUMENTS

| | | | | |
|---|---|---|---|---|
| 2012/0182963 A1* | 7/2012 | Kneckt | | H04W 72/0453 370/330 |
| 2013/0223427 A1 | 8/2013 | Sohn et al. | | |
| 2014/0341018 A1* | 11/2014 | Bhushan | | H04W 76/15 370/230 |
| 2015/0264589 A1* | 9/2015 | Kalkunte | | H04W 24/02 370/329 |
| 2015/0365830 A1* | 12/2015 | Wei | | H04J 3/1694 370/280 |
| 2016/0043843 A1* | 2/2016 | Liu | | H04L 5/0048 370/329 |
| 2016/0056929 A1* | 2/2016 | Kwon | | H04L 5/006 370/338 |
| 2016/0057770 A1* | 2/2016 | Yerramalli | | H04B 7/0811 370/329 |

(Continued)

FOREIGN PATENT DOCUMENTS

| | | |
|---|---|---|
| CN | 103202085 A | 7/2013 |
| CN | 104717686 A | 6/2015 |
| CN | 104812032 A | 7/2015 |

*Primary Examiner* — Minh Trang V Nguyen
(74) *Attorney, Agent, or Firm* — Sheppard Mullin Richter & Hampton LLP

(57) ABSTRACT

Embodiments of the present application disclose a method for determining channel occupancy, including: determining whether clear channel assessment CCA information of a channel sent by a user equipment UE is received; and determining, according to whether the CCA information sent by the UE is received, whether the UE occupies the channel. The present application further discloses an apparatus for determining channel occupancy. By means of the method and apparatus for determining channel occupancy in the embodiments of the present application, a peer device, such as a base station, in communication with the UE can know whether the UE occupies a channel, thus guaranteeing subsequent right decisions.

21 Claims, 21 Drawing Sheets

(56) References Cited

U.S. PATENT DOCUMENTS

| | | | |
|---|---|---|---|
| 2016/0073344 A1* | 3/2016 | Vutukuri | H04W 52/0216 |
| | | | 370/252 |
| 2016/0127098 A1* | 5/2016 | Ng | H04L 5/0048 |
| | | | 370/329 |
| 2016/0143014 A1* | 5/2016 | Mukherjee | H04W 74/0816 |
| | | | 370/330 |
| 2016/0302225 A1* | 10/2016 | Damnjanovic | H04W 72/1284 |
| 2016/0360420 A1* | 12/2016 | Liu | H04W 74/0816 |
| 2017/0019909 A1* | 1/2017 | Si | H04L 47/27 |

* cited by examiner

METHOD AND APPARATUS FOR DETERMINING CHANNEL OCCUPANCY

TECHNICAL FIELD

The present application relates to the field of communication technologies, and in particular, to a method and an apparatus for determining channel occupancy.

BACKGROUND

A "spectrum" is a "lifeline" of a mobile broadband network. At present, the only option for 4G development of mobile operators is to use licensed frequency bands, and use various technological innovations to improve current spectrum utilization. One of the approaches to deal with the increasing expansion pressure of mobile broadband networks is to use more new spectra. However, this involves reallocation of spectra, which causes a lot of new problems. Therefore, to use unlicensed spectra to implement expansion of mobile broadband networks has become one of the important 4G advancing directions.

Interference to an original system needs to be avoided when an unlicensed spectrum used. To resolve this problem, it is stipulated in some regions that clear channel assessment (CCA) needs to be performed before data transmission, to determine whether a channel is available, that is, before a user equipment (UE) needs to send data over a channel, the user equipment first performs receiving on this channel, and if it is found after a given period of time that no other user equipment sends data on this channel, the user equipment starts to send data; if it is found that another user equipment sends data, this process is tried again after a random period of time.

In the prior art, a CCA result of a UE is known by the UE only, and a peer device, such as a base station, in communication with the UE does not know the CCA result. Because the base station does not know whether the UE occupies the channel, some errors may occur when the base station makes decisions. For example, if the UE does not occupy the channel while the base station receives some data over the channel, the base station may mistakenly assume that the data is sent from the UE, and in this case, problems may occur during demodulation.

SUMMARY

An objective of the present application is to provide a method and an apparatus for determining channel occupancy.

According to a first embodiment of at least one embodiment of the present application, a method for determining channel occupancy is provided, including:

determining whether clear channel assessment CCA information of a channel sent by a user equipment UE is received; and determining, according to whether the CCA information sent by the UE is received, whether the UE occupies the channel.

According to a second aspect of at least one embodiment of the present application, an apparatus for determining channel occupancy is provided, including:

a first receiving module, configured to determine whether clear channel assessment CCA information of a channel sent by a user equipment UE is received; and a determining module, configured to determine, according to whether the CCA information sent by the UE is received, whether the UE occupies the channel.

According to a third aspect of at least one embodiment of the present application, an apparatus for determining channel occupancy is provided, including a memory and a processor, where the memory is configured to store an instruction; and the processor is configured to execute the instruction, to perform the following steps:

determining whether clear channel assessment CCA information of a channel sent by a user equipment UE is received; and determining, according to whether the CCA information sent by the UE is received, whether the UE occupies the channel.

By means of the method and apparatus for determining channel occupancy in the embodiments of the present application, a peer device, such as a base station, in communication with a UE can know whether the UE occupies a channel, thus guaranteeing subsequent right decisions.

DETAILED DESCRIPTION

Specific implementation manners of the present application are further described in detail with reference to the accompanying drawings and embodiments. The following embodiments are used to illustrate the present application, but are not used to limit the scope of the present application.

A person in the art should understand that sequence numbers of the following steps do not mean execution sequences in the embodiments of the present application. The execution sequences of the steps should be determined according to functions and internal logic of the steps, and should not be construed as any limitation on the implementation processes of the embodiments of the present application.

In addition, terms such as "first" and "second" in the present application are used only to distinguish different steps, devices, or modules, and neither represent any particular technical meaning nor indicate any necessary logic sequence between steps, devices, or modules.

Figure 1:
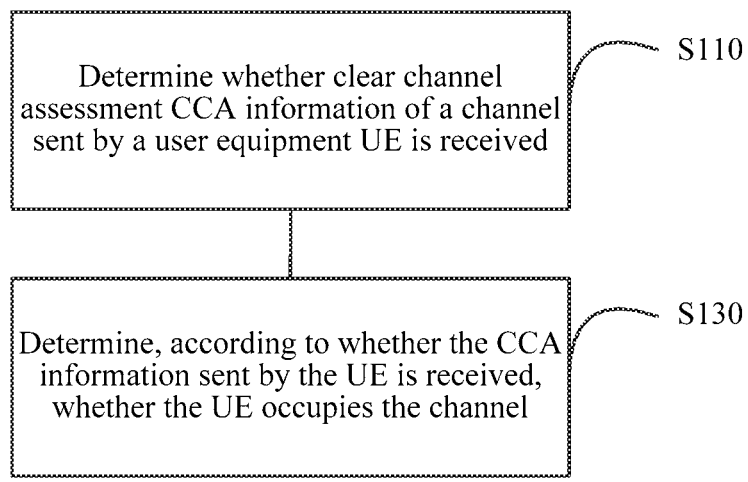
FIG. 1 is a schematic flowchart of a method for determining channel occupancy according to an embodiment of the present application.

FIG. 1 is a schematic flowchart of a method for determining channel occupancy according to an embodiment of the present application. Referring to FIG. 1, the method includes:

S110: Determine whether clear channel assessment CCA information of a channel sent by a user equipment UE is received.

S130: Determine, according to whether the CCA information sent by the UE is received, whether the UE occupies the channel.

By means of the method for determining channel occupancy in this embodiment of the present application, a peer device, such as a base station, in communication with a UE can know whether the UE occupies a channel, thus guaranteeing subsequent right decisions.

In this embodiment of the present application, the CCA information may be information related to a result of the CCA performed by the UE on the channel, for example, a CCA clear (Clear) message, or a CCA busy (busy) message, which is not specifically limited in this embodiment of the present application.

Figure 2:
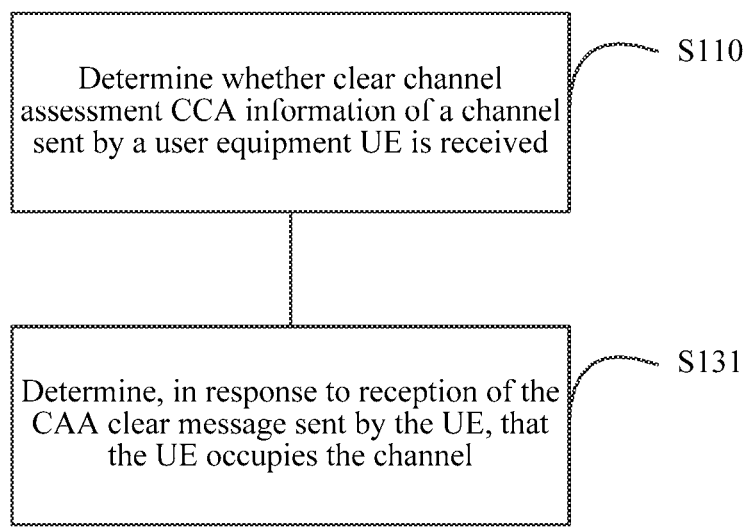
FIG. 2 is a schematic flowchart of another method for determining channel occupancy according to an embodiment of the present application.

Optionally, as shown in FIG. 2, in an embodiment of the present application, if the CCA information is the CAA clear message, the determining, according to whether the CCA information sent by the UE is received, whether the UE occupies the channel (S130) may include:

S131: Determine, in response to reception of the CAA clear message sent by the UE, that the UE occupies the channel.

Figure 3:
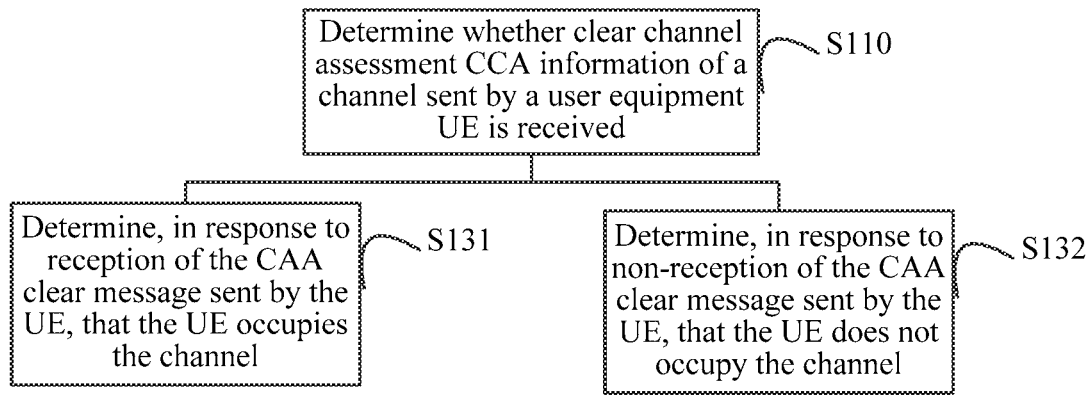
FIG. 3 is a schematic flowchart of another method for determining channel occupancy according to an embodiment of the present application.

Optionally, as shown in FIG. 3, in an embodiment of the present application, if the CCA information is the CAA clear message, the determining, according to whether the CCA information sent by the UE is received, whether the UE occupies the channel (S130) may further include:

S132: Determine, in response to non-reception of the CAA clear message sent by the UE, that the UE does not occupy the channel.

Figure 4:
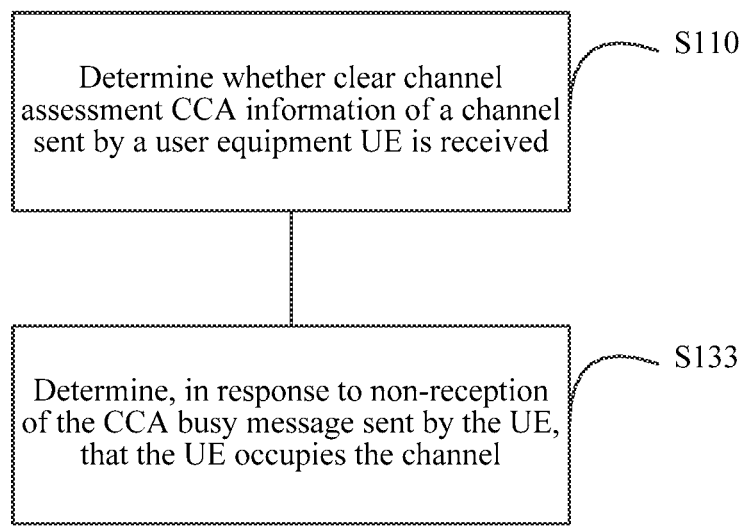
FIG. 4 is a schematic flowchart of another method for determining channel occupancy according to an embodiment of the present application.

Optionally, as shown in FIG. 4, in an embodiment of the present application, if the CCA information is the CCA busy message, the determining, according to whether the CCA information sent by the UE is received, whether the UE occupies the channel (S130) may include:

S133: Determine, in response to non-reception of the CCA busy message sent by the UE, that the UE occupies the channel.

Figure 5:
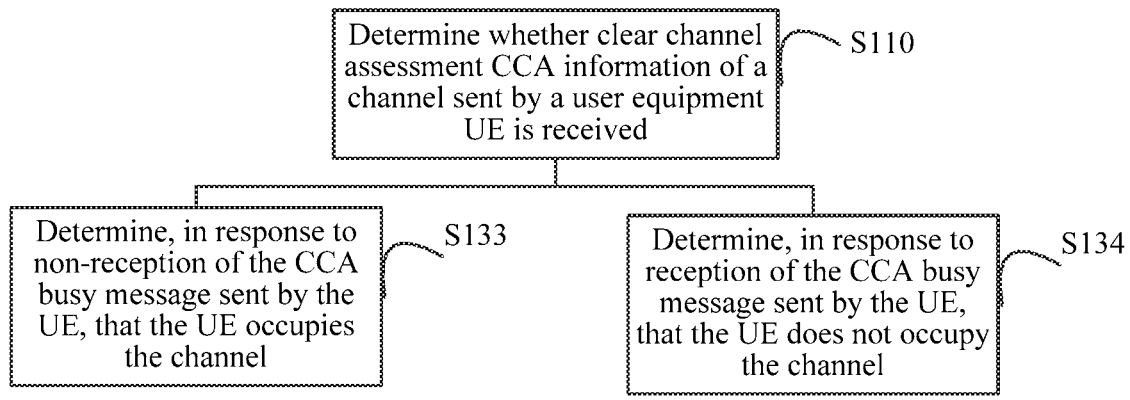
FIG. 5 is a schematic flowchart of another method for determining channel occupancy according to an embodiment of the present application.

Optionally, as shown in FIG. 5, in an embodiment of the present application, if the CCA information is the CCA busy message, the determining, according to whether the CCA information sent by the UE is received, whether the UE occupies the channel (S130) may further include:

S134: Determine, in response to reception of the CCA busy message sent by the UE, that the UE does not occupy the channel.

Figure 6A:
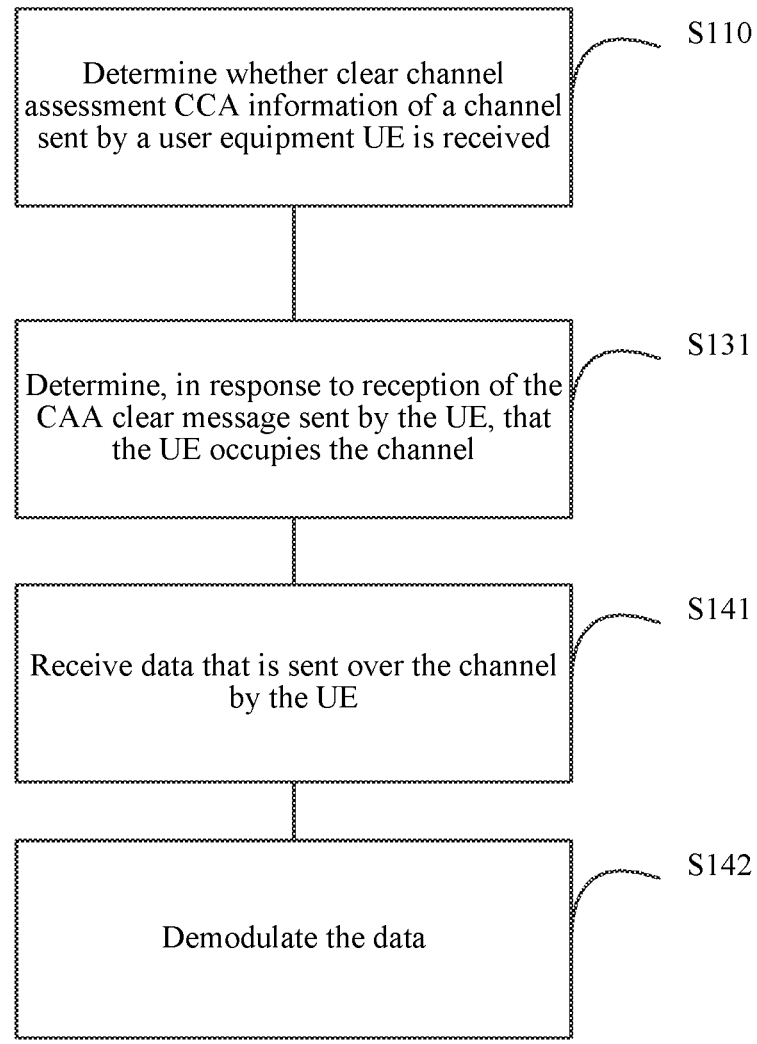
FIG. 6a and FIG. 6b are schematic flowcharts of another method for determining channel occupancy according to an embodiment of the present application.
Figure 6B:
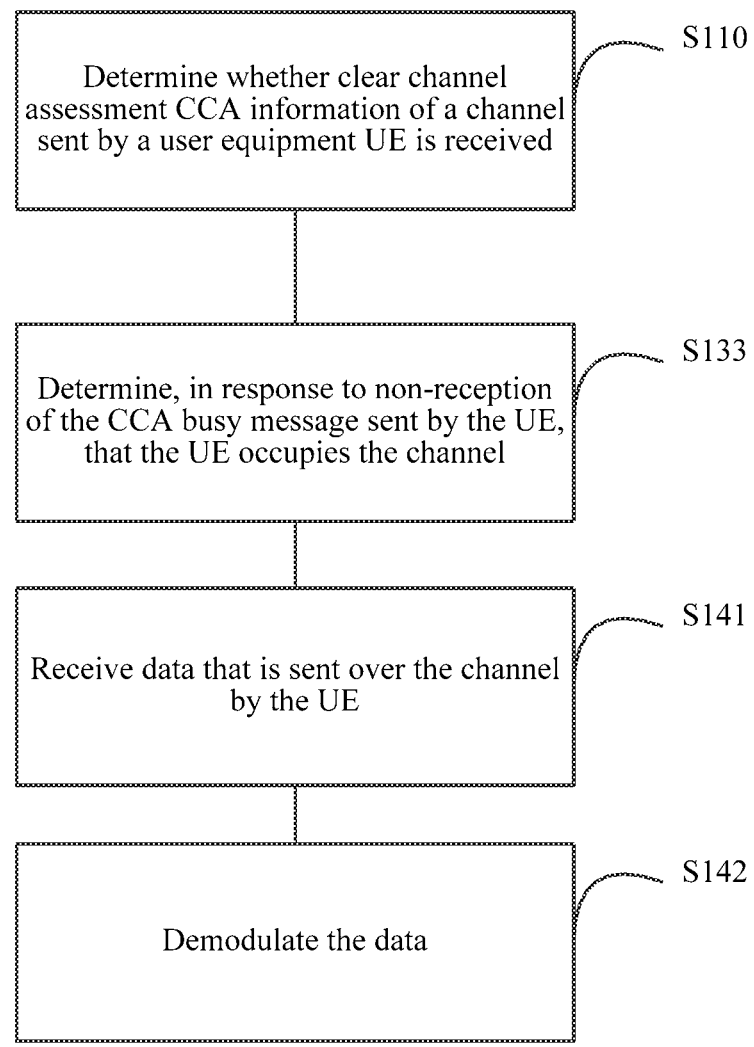

Optionally, as shown in FIG. 6a and FIG. 6b, in an embodiment of the present application, after the determining that the UE occupies the channel (S131 or S133), the method may further include:

S141: Receive data that is sent over the channel by the UE.

S142: Demodulate the data.

Because it is determined that the UE has occupied the channel, it is convinced that data transmitted over the channel is data from the UE.

Figure 7A:
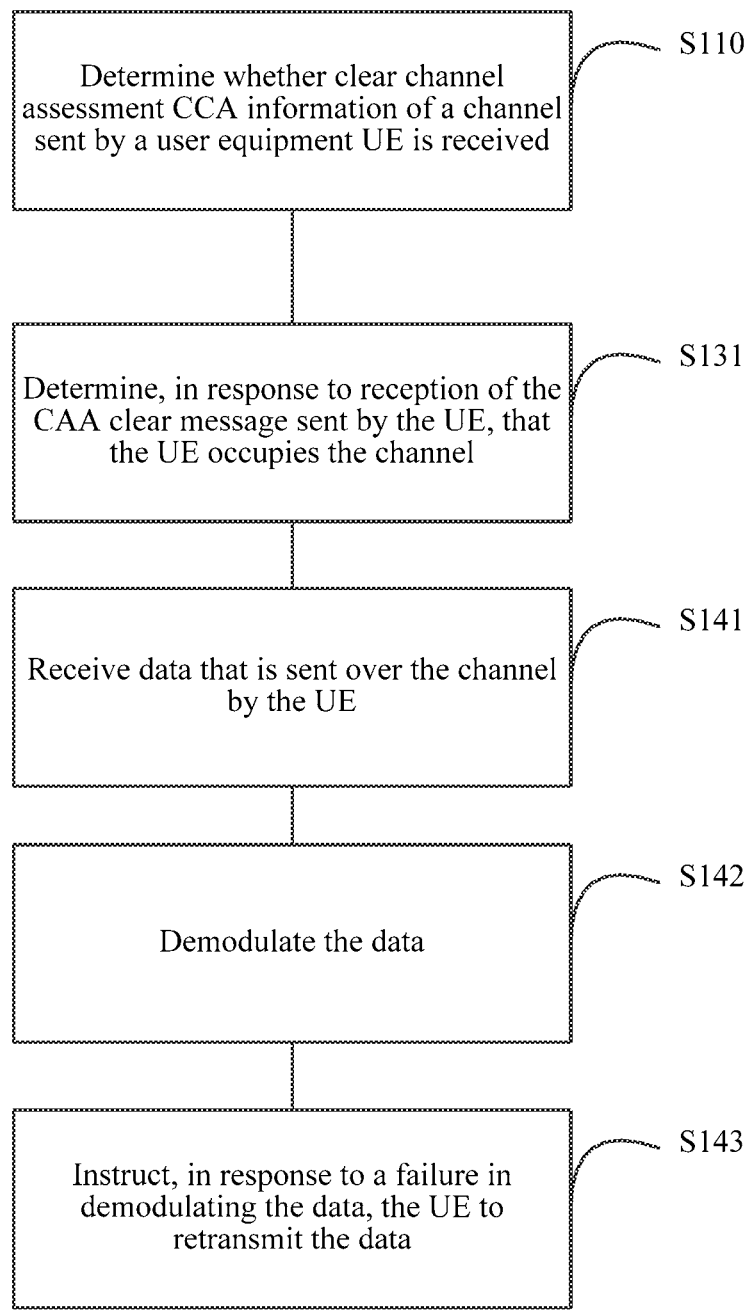
FIG. 7a and FIG. 7b are schematic flowcharts of another method for determining channel occupancy according to an embodiment of the present application.
Figure 7B:
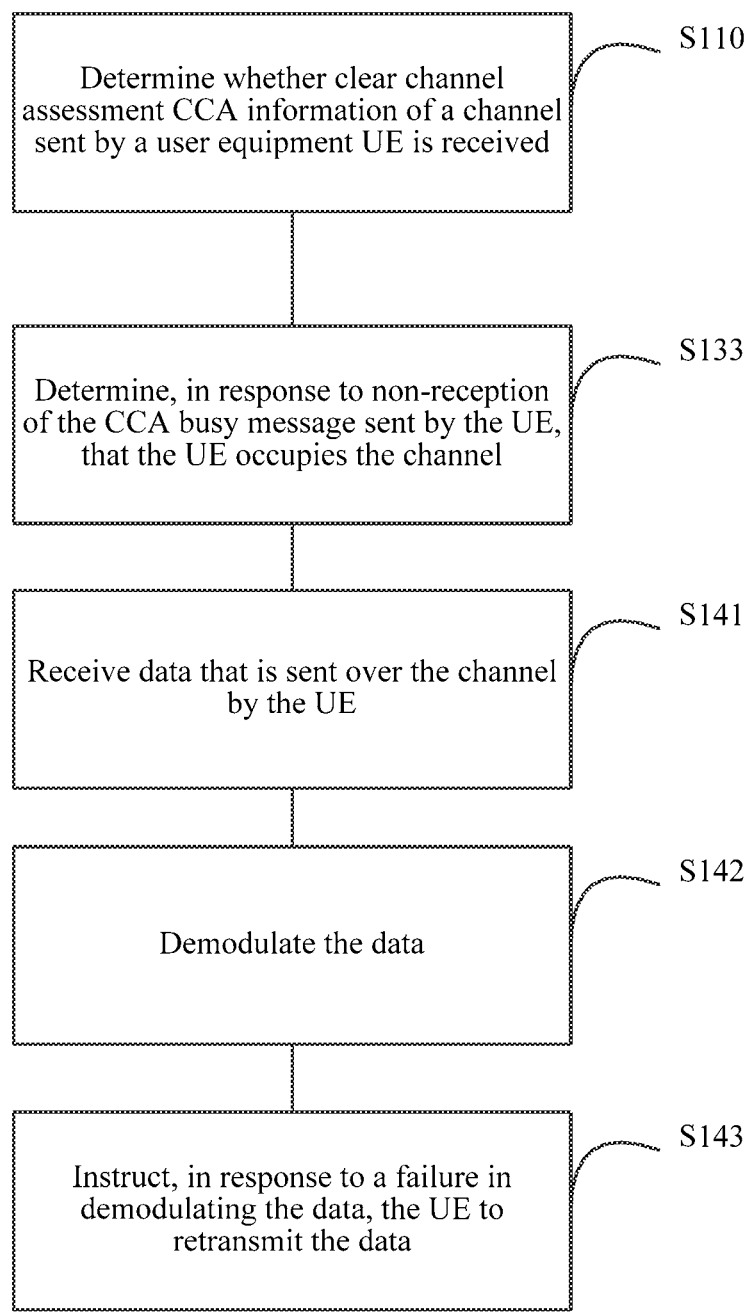

Optionally, as shown in FIG. 7a and FIG. 7b, in another embodiment of the present application, if the demodulation of the data in S142 fails, the method may further include:

S143: Instruct, in response to a failure in demodulating the data, the UE to retransmit the data.

For example, a new data indicator (NDI) in a hybrid automatic repeat request (HARQ) may be not toggled, and a redundancy version (RV) is configured to be 1, 2, 3 or the like.

Figure 8A:
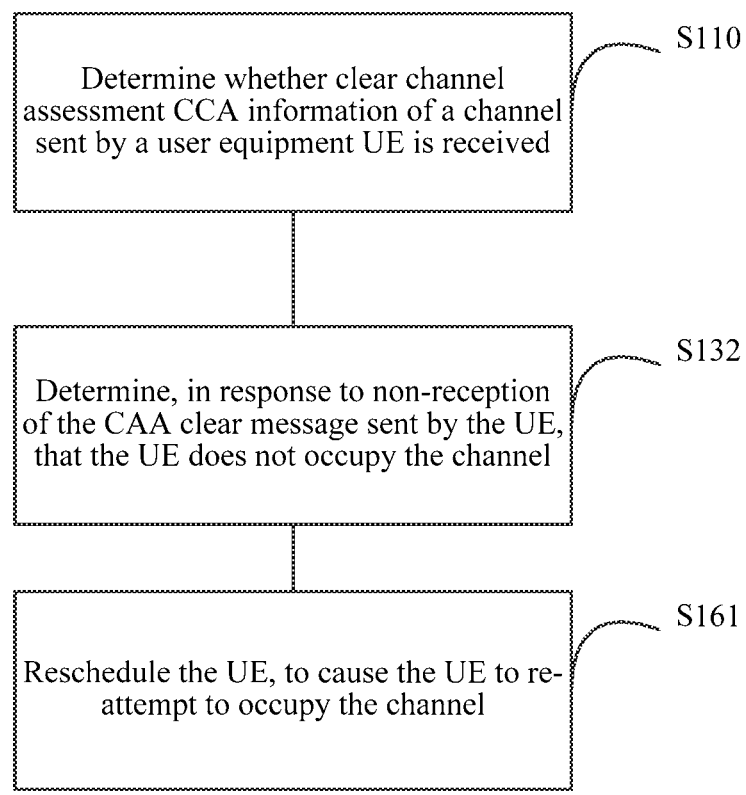
FIG. 8a and FIG. 8b are schematic flowcharts of a method for determining channel occupancy according to an embodiment of the present application.
Figure 8B:
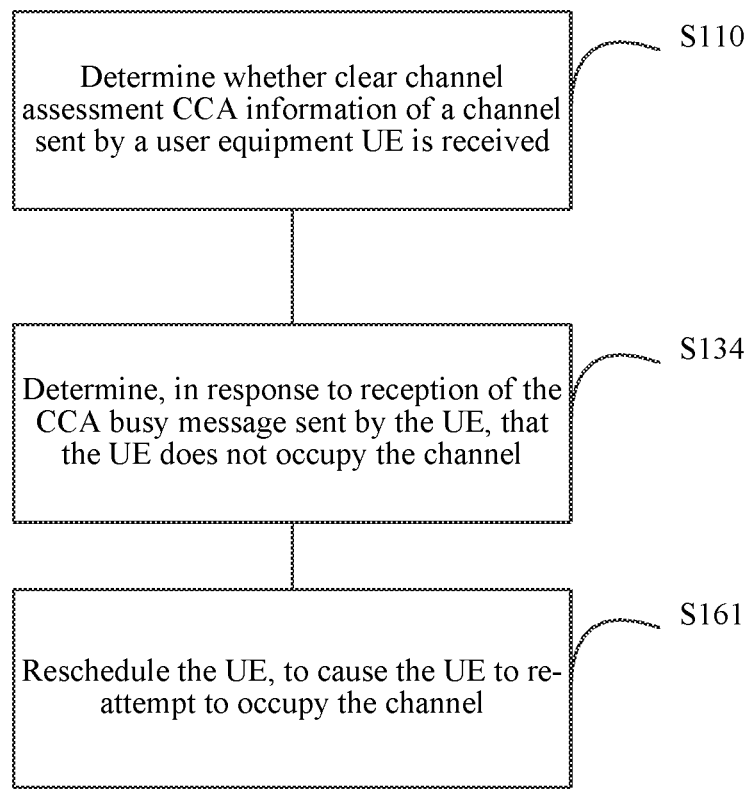

Optionally, as shown in FIG. 8a and FIG. 8b, after the determining that the UE does not occupy the channel (S132 or S134), the method may further include:

S161: Reschedule the UE, to cause the UE to re-attempt to occupy the channel.

Exemplarily, a new data indicator (NDI) in a hybrid automatic repeat request (HARQ) may be toggled, and a redundancy version (RV) is configured to be 0 or the like.

Figure 9A:
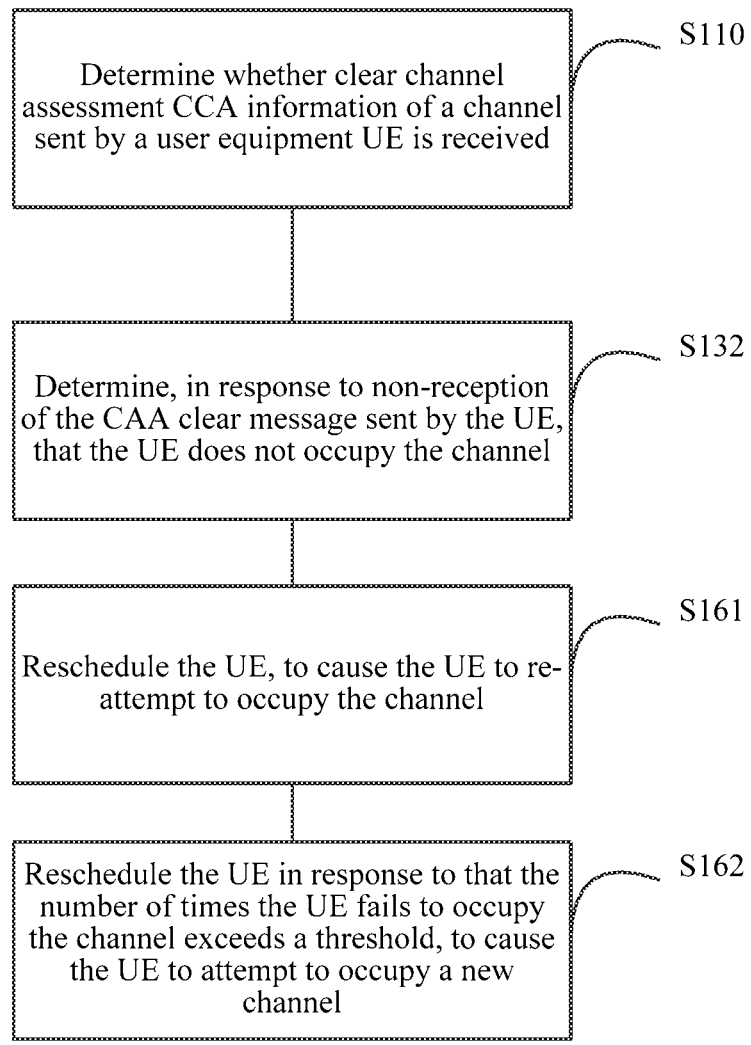
FIG. 9a and FIG. 9b are schematic flowcharts of another method for determining channel occupancy according to an embodiment of the present application.
Figure 9B:
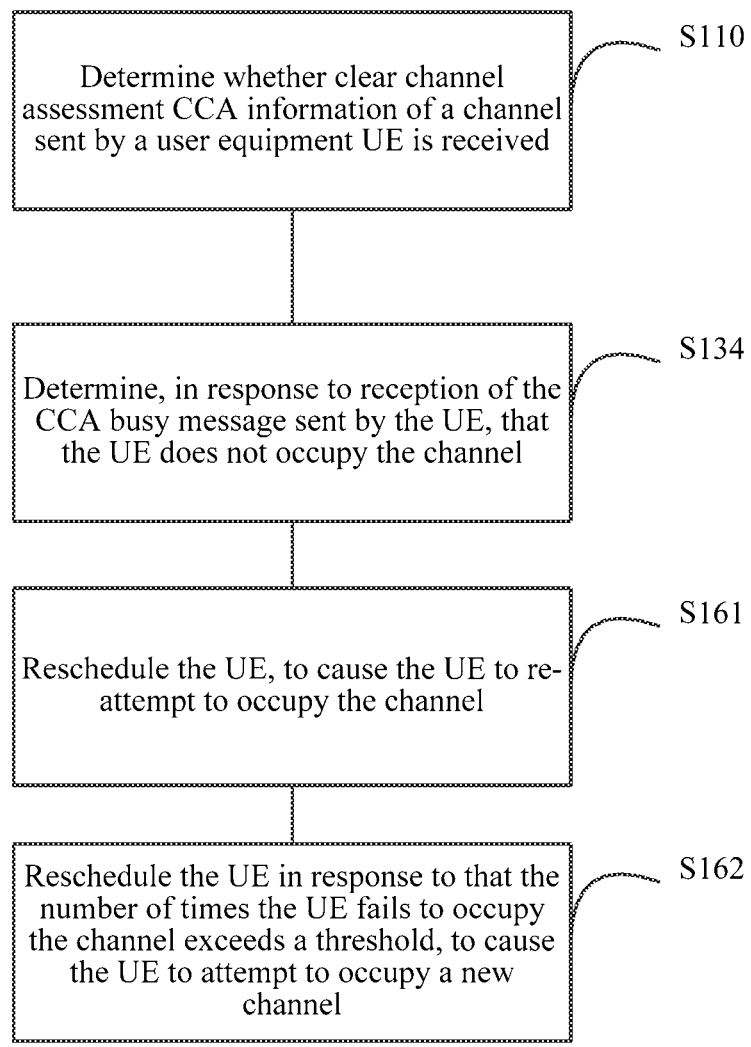

Optionally, as shown in FIG. 9a and FIG. 9b, if the number of times that the UE fails to occupy the channel exceeds a threshold, the method may further include:

S162: Reschedule the UE in response to that the number of times the UE fails to occupy the channel exceeds a threshold, to cause the UE to attempt to occupy a new channel.

For example, attempts made by the UE to occupy a channel fail constantly, and if the number of failures exceeds a preset threshold, for example, three times, stop scheduling the UE to occupy the channel; the UE may be rescheduled, so as to attempt to occupy another channel. The another channel herein may be a new carrier of a different frequency, or a new frequency block of a same carrier, which is not specifically limited in this embodiment of the present application.

Figure 10:
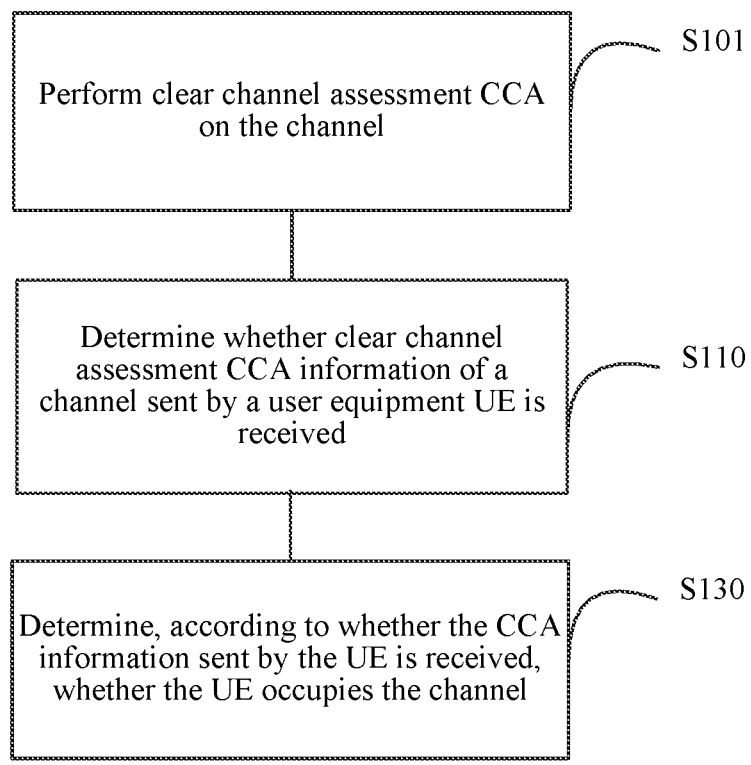
FIG. 10 is a schematic flowchart of another method for determining channel occupancy according to an embodiment of the present application.

Optionally, as shown in FIG. 10, before the determining whether the CCA information of the channel sent by the UE is received (S110), the method further includes:

S101: Perform clear channel assessment CCA on the channel.

Exemplarily, in some scenarios in which two parties of communication (for example, a UE and a base station) are relatively away from each other, both communication parties may perform clear channel assessment on the channel.

Figure 11:
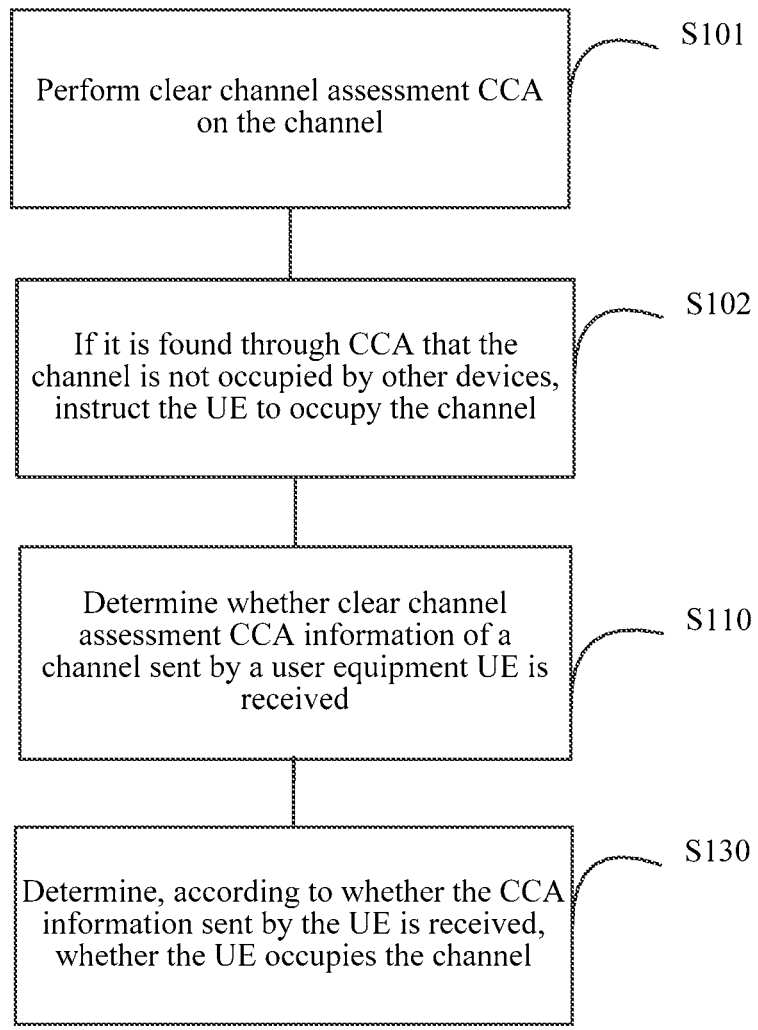
FIG. 11 is a schematic flowchart of another method for determining channel occupancy according to an embodiment of the present application.

Optionally, as shown in FIG. 11, after the performing clear channel assessment CCA on the channel (S101), the method may further include:

S102: If it is found through CCA that the channel is not occupied by other devices, instruct the UE to occupy the channel.

Optionally, in an implementation manner of the present application, the UE and the peer end in communication with the UE may perform CCA at the same time, or at slightly different times, which does not affect the implementation of the solution of the present application, and is not specifically limited in this embodiment of the present application.

After the UE is notified that the channel can be occupied, feedback from the UE can be waited for. If CCA information fed back by the UE arrives within a preset time, it can be determined that the UE has successfully occupied the channel; on the contrary, if no CCA information fed back by the UE arrives within the preset time, it can be determined that the UE has failed to occupy the channel.

Exemplarily, assuming that the UE is notified in the $n^{th}$ subframe that the channel can be occupied, if no CCA information fed back by the UE is received by the $(n+4)^{th}$ subframe, it can be considered that the UE has failed to occupy the channel.

Figure 12:
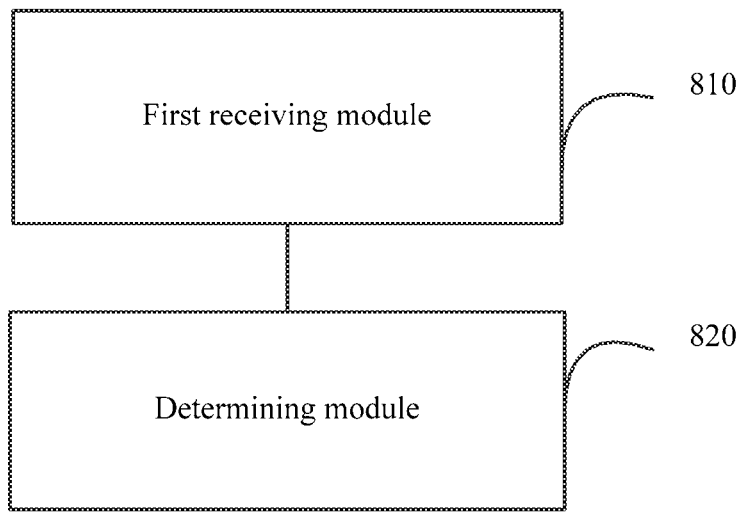
FIG. 12 is a schematic structural diagram of an apparatus for determining channel occupancy according to an embodiment of the present application.

FIG. 12 is a schematic structural diagram of an apparatus for determining channel occupancy according to an embodiment of the present application. Referring to FIG. 12, the apparatus includes:

a first receiving module 810, configured to determine whether clear channel assessment CCA information of a channel sent by a user equipment UE is received; and a determining module 820, configured to determine, according to whether the CCA information sent by the UE is received, whether the UE occupies the channel.

By means of the apparatus for determining channel occupancy in this embodiment of the present application, a peer device, such as a base station, in communication with a UE can know whether the UE occupies a channel, thus guaranteeing subsequent right decisions.

Figure 13:
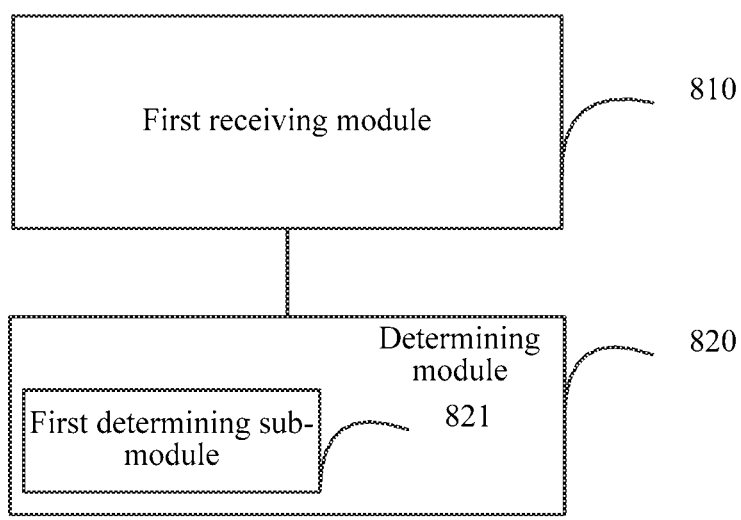
FIG. 13 is a schematic structural diagram of another apparatus for determining channel occupancy according to an embodiment of the present application.

Optionally, as shown in FIG. 13, if the CCA information is a CAA clear message, the determining module 820 may include:

a first determining sub-module 821, configured to determine, in response to reception of the CAA clear message sent by the UE, that the UE occupies the channel.

Figure 14:
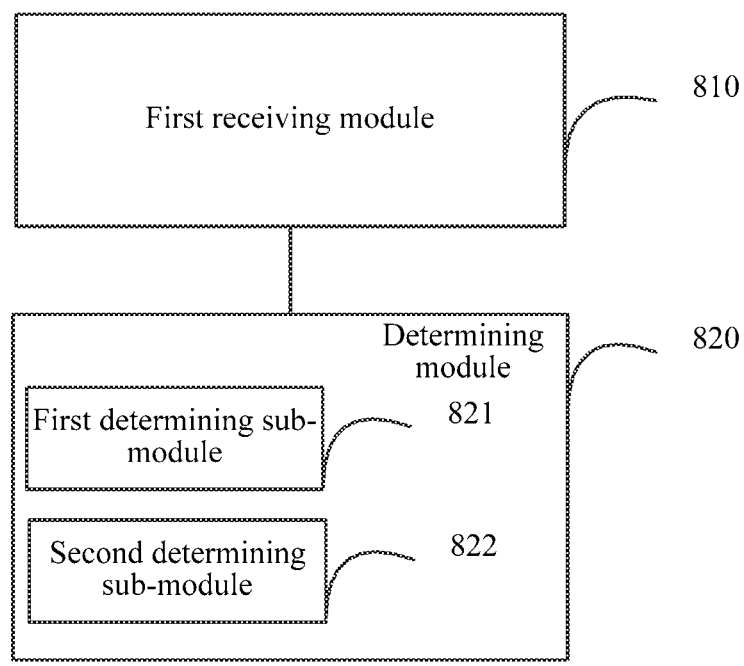
FIG. 14 is a schematic structural diagram of another apparatus for determining channel occupancy according to an embodiment of the present application.

Optionally, as shown in FIG. 14, if the CCA information is the CAA clear message, and the determining module 820 may further include:

a second determining sub-module 822, configured to determine, in response to non-reception of the CAA clear message sent by the UE, that the UE does not occupy the channel.

Figure 15:
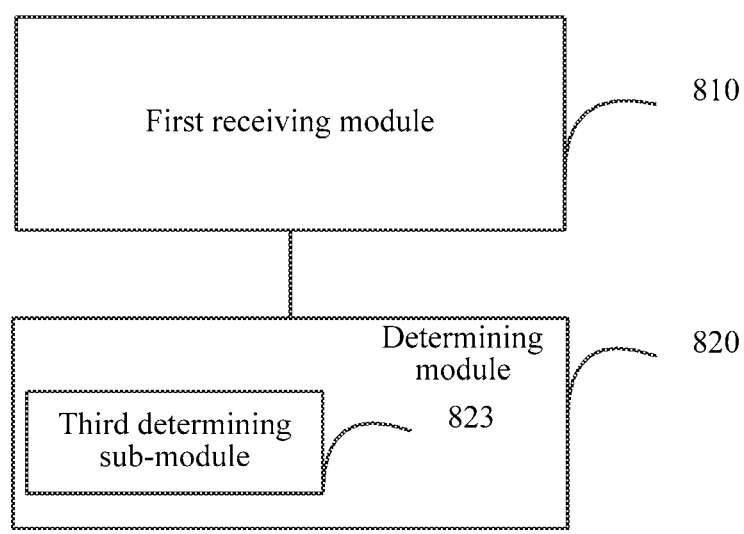
FIG. 15 is a schematic structural diagram of another apparatus for determining channel occupancy according to an embodiment of the present application.

Optionally, as shown in FIG. 15, if the CCA information is a CCA busy message, the determining module 820 may include:

a third determining sub-module 823, configured to determine, in response to non-reception of the CCA busy message sent by the UE, that the UE occupies the channel.

Figure 16:
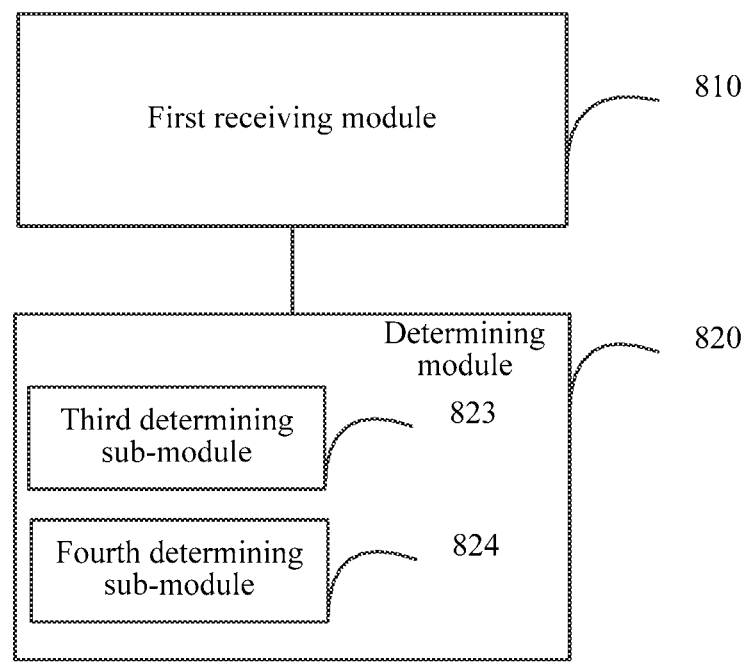
FIG. 16 is a schematic structural diagram of another apparatus for determining channel occupancy according to an embodiment of the present application.

Optionally, as shown in FIG. 16, if the CCA information is the CCA busy message, the determining module 820 may further include:

a fourth determining sub-module 824, configured to determine, in response to reception of the CCA busy message sent by the UE, that the UE does not occupy the channel.

Figure 17:
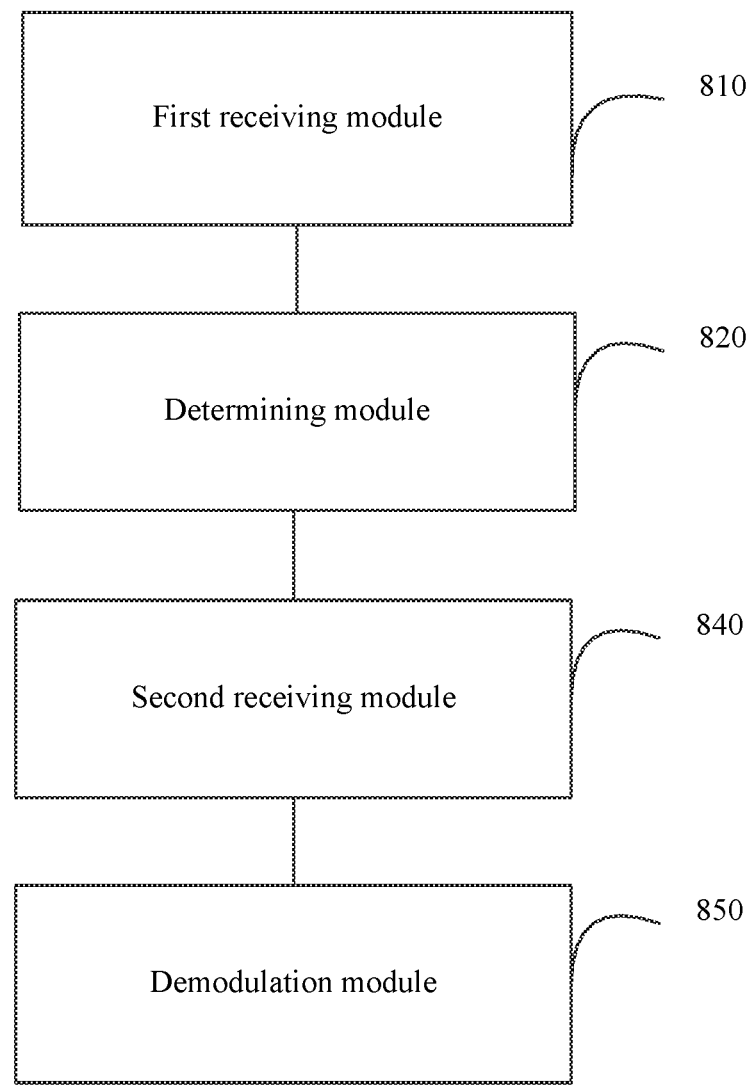
FIG. 17 is a schematic structural diagram of another apparatus for determining channel occupancy according to an embodiment of the present application.

Optionally, as shown in FIG. 17, the apparatus may further include:

a second receiving module 840, configured to: after the first determining sub-module 821 or the third determining sub-module 823 determines that the UE occupies the channel, receive data that is sent over the channel by the UE; and a demodulation module 850, configured to demodulate the data.

Figure 18:
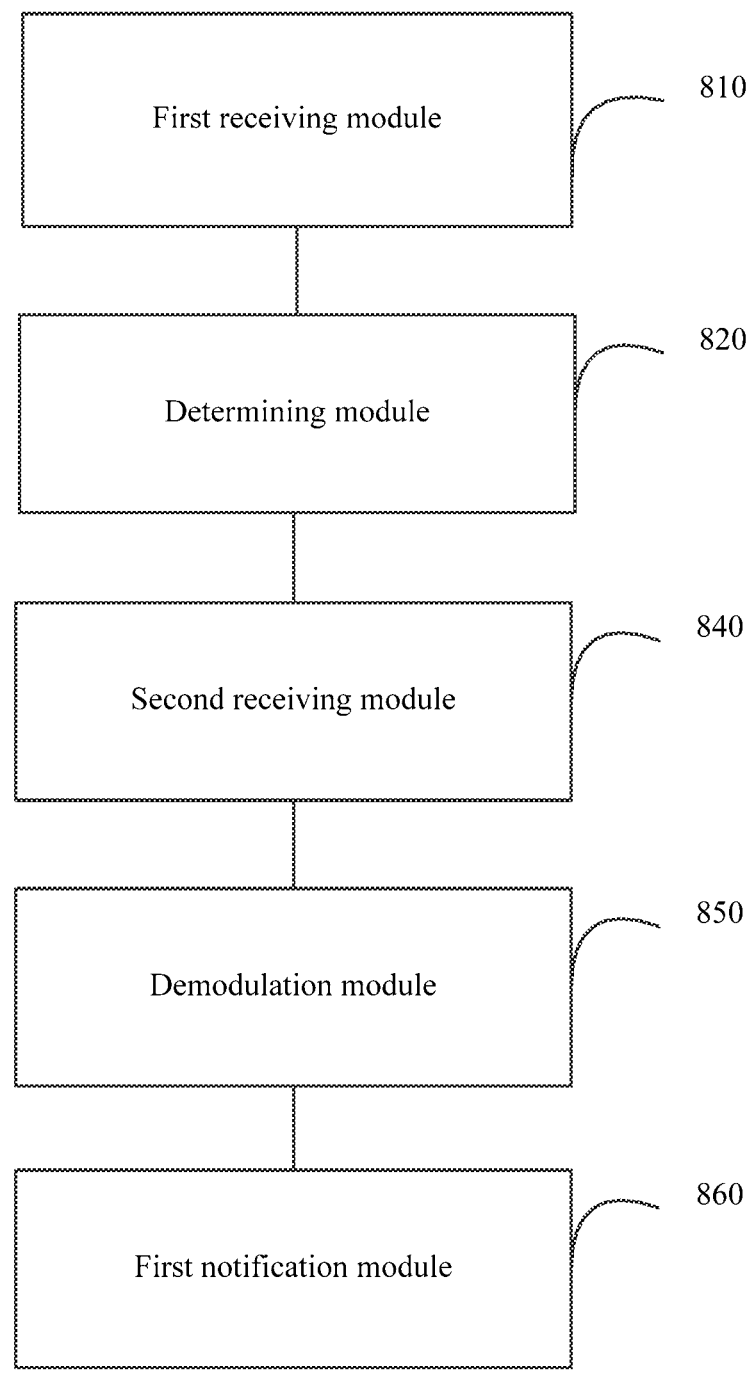
FIG. 18 is a schematic structural diagram of another apparatus for determining channel occupancy according to an embodiment of the present application.

Optionally, as shown in FIG. 18, the apparatus may further include:

a first notification module 860, configured to instruct, in response to a failure in demodulating the data by the demodulation module 850, the UE to retransmit the data.

Figure 19:
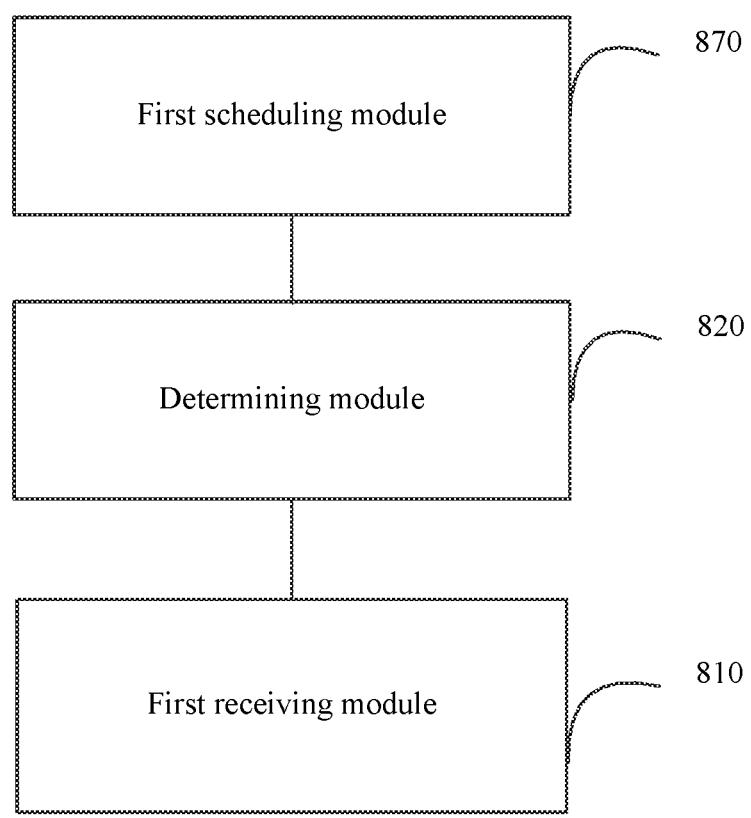
FIG. 19 is a schematic structural diagram of another apparatus for determining channel occupancy according to an embodiment of the present application.

Optionally, as shown in FIG. 19, the apparatus may further include:

a first scheduling module 870, configured to: after the second determining sub-module 822 or the fourth determining sub-module 824 determines that the UE does not occupy the channel, reschedule the UE, to cause the UE to re-attempt to occupy the channel.

Figure 20:
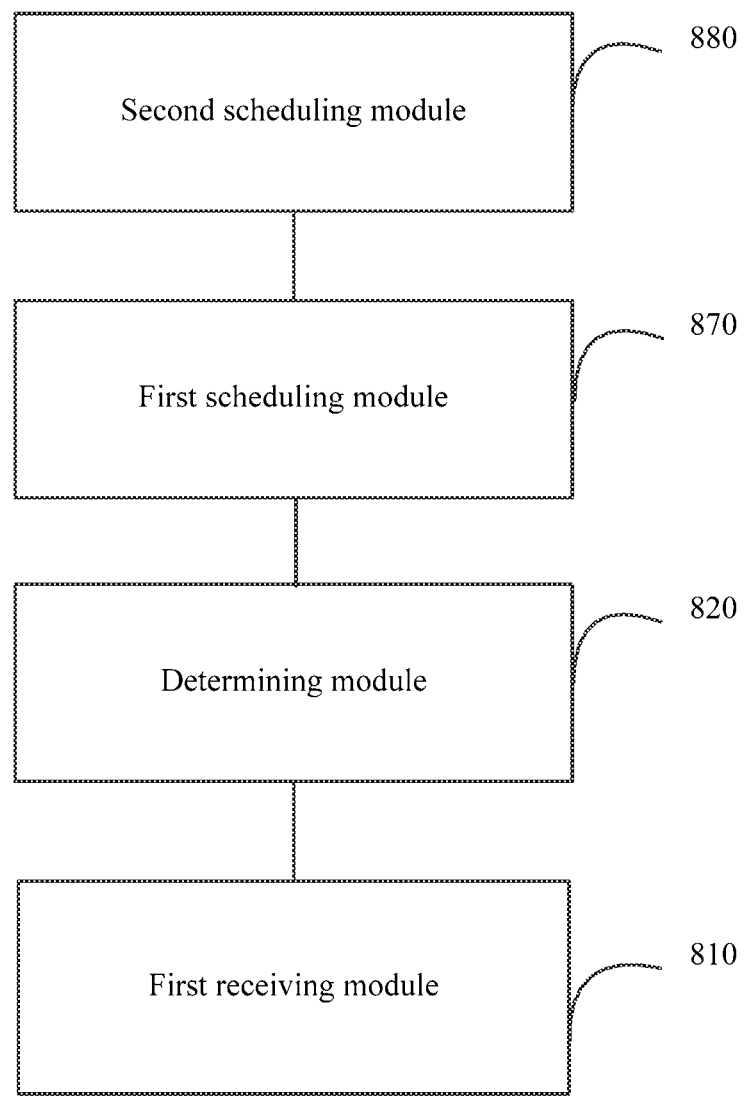
FIG. 20 is a schematic structural diagram of another apparatus for determining channel occupancy according to an embodiment of the present application.

Optionally, as shown in FIG. 20, the apparatus may further include:

a second scheduling module 880, configured to reschedule the UE in response to that the number of times the UE fails to occupy the channel exceeds a threshold, to cause the UE to attempt to occupy a new channel.

Figure 21:
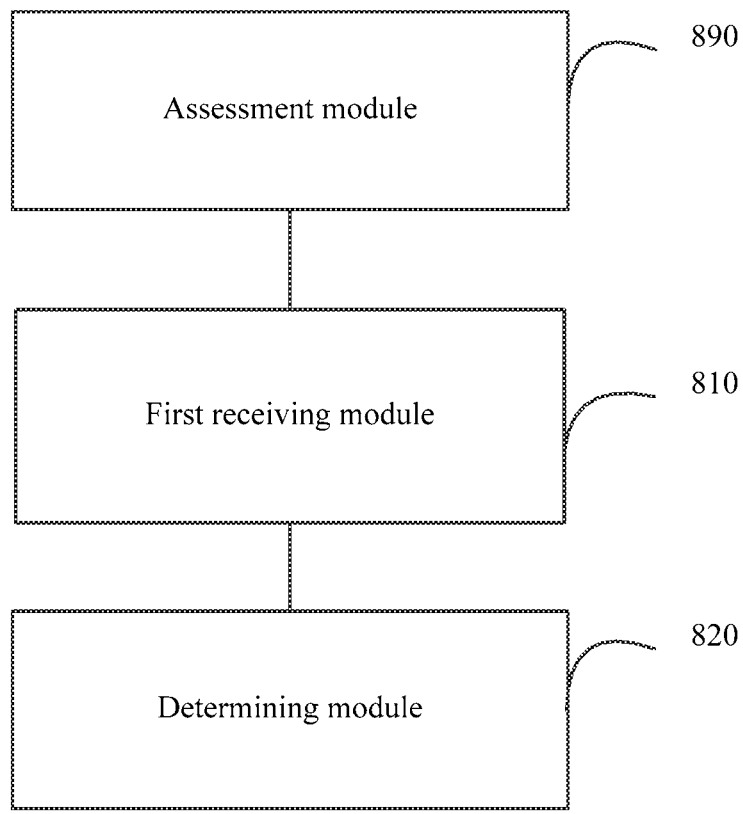
FIG. 21 is a schematic structural diagram of another apparatus for determining channel occupancy according to an embodiment of the present application.

Optionally, as shown in FIG. 21, the apparatus may further include:

an assessment module 890, configured to perform clear channel assessment CCA on the channel.

Figure 22:
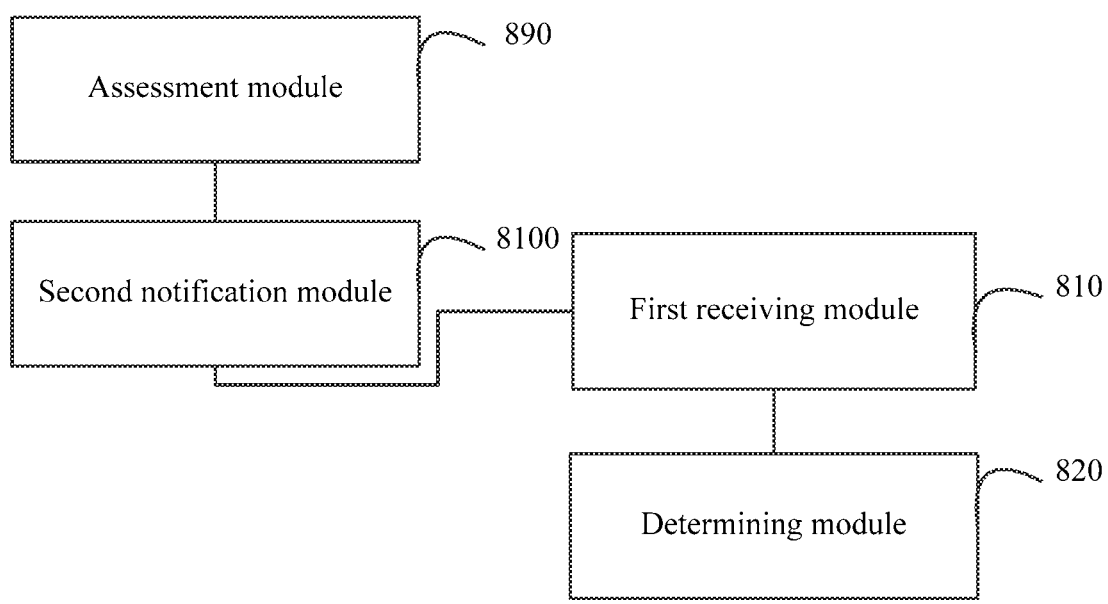
FIG. 22 is a schematic structural diagram of another apparatus for determining channel occupancy according to an embodiment of the present application.

Optionally, as shown in FIG. 22, the apparatus may further include:

a second notification module 8100, configured to instruct, in response to non-occupancy of the channel, the UE to occupy the channel.

Figure 23:
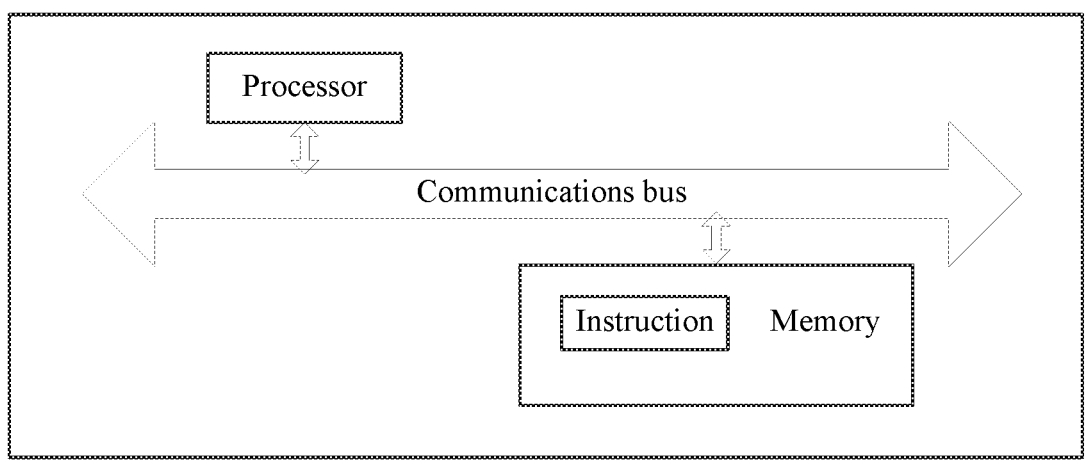
FIG. 23 is a schematic structural diagram of an apparatus for determining channel occupancy according to another embodiment of the present application.

As shown in FIG. 23, another embodiment of the present application further provides an apparatus for determining channel occupancy, including a memory and a processor, where the memory is configured to store an instruction; and the processor is configured to execute the instruction, so as to perform the following steps:

determining whether clear channel assessment CCA information of a channel sent by a user equipment UE is received; and determining, according to whether the CCA information sent by the UE is received, whether the UE occupies the channel.

The processor may be a central processing unit (CPU) or an application-specific integrated circuit (ASIC), or configured as one or more integrated circuits for implementing an embodiment of a method for determining channel occupancy.

The memory may be any medium that is capable of storing program code, such as a USB flash drive, a removable hard disk, a read-only memory (ROM), a random access memory (RAM), a magnetic disk, or an optical disc.

The processor may communicate with the memory by using a communications bus.

A person skilled in the art may clearly understand that, to make the descriptions convenient and simple, the method for determining channel occupancy described above may be implemented by using the aforementioned apparatus for determining channel occupancy of the present application. Reference may be made to corresponding processes of the foregoing embodiment of the method for determining channel occupancy of the present application, and details are not described herein again.

Exemplarily, the foregoing apparatus for determining channel occupancy may be a peer device, such as a base station, in communication with a UE; or may be some logical modules of a peer device, such as a base station, in communication with the UE, which is not specifically limited in this embodiment of the present application.

A person of ordinary skill in the art may be aware that the various exemplary units and method steps described in conjunction with the embodiments disclosed herein can be implemented by electronic hardware, or a combination of computer software and electronic hardware. Whether the functions are executed by hardware or software depends on particular applications and design constraint conditions of the technical solutions. A person skilled in the art can use different methods to implement the described functions for every particular application, but it should not be considered that the implementation goes beyond the scope of the present application.

When being implemented in the form of a software function unit and sold or used as a stand-alone product, the functions may be stored in a computer-readable storage medium. Based on such understanding, the essence of the technical solutions of the present application, or part that makes contributions to the prior art, or part of the technical solution may be embodied in the form of a software product. The computer software product may be stored in a storage medium, and incorporates several instructions for instructing a computer device (for example, a personal computer, a server, or a network device) to execute all or some of the steps of the methods in the embodiments of the present application. The storage medium may be any medium that is capable of storing program code, such as a USB flash drive, a removable hard disk, a read-only memory (ROM), a random access memory (RAM), a magnetic disk, or an optical disc.

The foregoing implementation manners are merely used to illustrate the present application, but are not used to limit the present application. A person of ordinary skill in related art may make various alterations and variations without departing from the spirit and scope of the present application. Therefore, all equivalent technical solutions belong to the scope of the present application, and the patent protection scope of the present application should be subject to the claims.

What is claimed is:

1. A method for determining channel occupancy, comprising:

performing, by a base station, clear channel assessment (CCA) on a channel for user equipment (UE);

instructing, by the base station, the UE to occupy the channel in response to determining that the channel is not occupied by a device based on the CCA performed by the base station;

determining, by the base station, whether CCA information of the channel sent by the UE is received; and determining, by the base station, according to whether the CCA information is received, whether the channel is occupied by the UE.

2. The method of claim 1, wherein the CCA information comprises a CCA clear message or a CCA busy message.

3. The method of claim 2, wherein
the CCA information is the CCA busy message, and
the determining, according to whether the CCA information sent by the UE is received, whether the channel is occupied by the UE comprises:
determining, in response to non-reception of the CCA busy message sent by the UE, that the channel is occupied by the UE.

4. The method of claim 3, wherein the determining, according to whether the CCA information sent by the UE is received, whether the channel is occupied by the UE further comprises:
determining, in response to reception of the CCA busy message sent by the UE, that the channel is not occupied by the UE.

5. The method of claim 2, wherein
the CCA information is the CCA clear message, and
the determining, according to whether the CCA information sent by the UE is received, whether the channel is occupied by the UE comprises:
determining, in response to reception of the CCA clear message sent by the UE, that the channel is occupied by the UE.

6. The method of claim 5, wherein the determining, according to whether the CCA information sent by the UE is received, whether the channel is occupied by the UE further comprises:
determining, in response to non-reception of the CCA clear message sent by the UE, that the channel is not occupied by the UE.

7. The method of claim 5, wherein after the determining that the channel is occupied by the UE, the method further comprises:
receiving data that is sent over the channel by the UE; and
demodulating the data.

8. The method of claim 7, wherein the method further comprises:
instructing, in response to a failure in demodulating the data, the UE to retransmit the data.

9. The method of claim 5, wherein after the determining that the channel is not occupied by the UE, the method further comprises:
rescheduling the UE, to cause the UE to re-attempt to occupy the channel.

10. The method of claim 9, further comprising:
rescheduling the UE, in response to that a number of times the UE fails to occupy the channel exceeds a threshold, to cause the UE to attempt to occupy a new channel.

11. The method of claim 1, wherein the determining whether the CCA information of the channel sent by the UE is received comprises:
determining, within a preset time after instructing the UE to occupy the channel, whether the CCA information of the channel sent by the UE is received.

12. An apparatus for determining channel occupancy, applicable to a base station, comprising:
- an assessment module, configured to perform clear channel assessment (CCA) on a channel for user equipment (UE);
- a first notification module, configured to instruct the UE to occupy the channel, in response to determining that the channel is not occupied by a device based on the CCA performed by the base station;
- a first receiving module, configured to determine whether CCA information of the channel sent by the UE is received; and
- a determining module, configured to determine, according to whether the CCA information is received, whether the channel is occupied by the UE.

13. An apparatus for determining channel occupancy, applicable to a base station, comprising a memory and a processor, wherein the memory is configured to store an instruction; and the processor is configured to execute the instruction to perform operations including:
- performing clear channel assessment (CCA) on a channel for user equipment (UE);
- instructing the UE to occupy the channel in response to determining that the channel is not occupied by a device based on the CCA performed by the base station;
- determining whether CCA information of the channel sent by the UE is received; and
- determining, according to whether the CCA information is received, whether the channel is occupied by the UE.

14. The apparatus of claim 13, wherein
the CCA information is a CCA clear message, and
the operations further comprise:
in response to reception of the CCA clear message sent by the UE, determining that the channel is occupied by the UE.

15. The apparatus of claim 14, wherein the operations further comprise:
in response to non-reception of the CCA clear message sent by the UE, determining that the channel is not occupied by the UE.

16. The apparatus of claim 14, wherein the operations further comprise:
- after determining that the channel is occupied by the UE, receiving data that is sent over the channel by the UE; and
- demodulating the data.

17. The apparatus of claim 16, wherein the operations further comprise:
in response to a failure in demodulating the data by the demodulation module, instructing the UE to retransmit the data.

18. The apparatus of claim 14, wherein the operations further comprise:
after determining that the channel is not occupied by the UE, rescheduling the UE to cause the UE to re-attempt to occupy the channel.

19. The apparatus of claim 18, wherein the operations further comprise:
in response to that a number of times the UE fails to occupy the channel exceeds a threshold, rescheduling the UE to cause the UE to attempt to occupy a new channel.

20. The apparatus of claim 13, wherein
the CCA information is a CCA busy message, and
the operations further comprise:
in response to non-reception of the CCA busy message sent by the UE, determining that the channel is occupied by the UE.

21. The apparatus of claim 20, wherein the operations further comprise:
in response to reception of the CCA busy message sent by the UE, determining that the channel is not occupied by the UE.

* * * * *